3,113,084
CHLORINATION
Albert J. Biardinelli and William H. Yanko, Dayton, Ohio, assignors to Monsanto Chemical Company, St. Louis, Mo., a corporation of Delaware
No Drawing. Filed Oct. 15, 1956, Ser. No. 615,759
10 Claims. (Cl. 204—158)

This invention relates to chlorination and more particularly provides a novel method for the manufacture of chloroalkyl esters of aromatic acids, some of which are new.

It is an object of the present invention to provide a novel synthesis of chloroalkyl esters of aromatic acids by direct chlorination of the corresponding alkyl esters of aromatic acids. Another object of this invention is the provision of a method for the synthesis of α-chloroalkyl esters of aromatic acids. An additional object of this invention is the provision of a novel synthesis of chloromethyl esters of aromatic acids. A further object of the invention is to provide α-chloroalkyl alkyl esters of a benzenedicarboxylic acid. Another object of the present invention is the provision of novel chlorine-containing carbocyclic acid esters. These and other objects are attained as described hereinbelow.

It is known that aromatic compounds contacted with chlorine at low temperatures undergo additive chlorination, and that light accelerates this reaction. Thus, benzene reacts with chlorine at 20–60° C. in the presence of actinic radiation to form benzene hexachloride, and benzonitrile similarly forms 1,2,3,4,5,6-hexachlorocyclohexanecarbonitrile. In the presence of halogen transfer catalysts such as ferric chloride, instead of addition, a nuclear substitution reaction occurs. Benzene derivatives containing activating substituents such as methyl and hydroxy groups, e.g., cresols, are reported to undergo nuclear substitutive chlorination in the absence of halogen transfer catalysts.

Attempts have been made previously to chlorinate alkyl esters of aromatic acids; it was found that, whereas ethyl benzoate, for example, is unreactive to chlorine at below 100° C., above this temperature cleavage occurs and there are obtained only the acid chlorides of benzoic and acetic acids. (Seelig, J. prakt. Chem. (2) 39, 173–178). More vigorous chlorinating agents such as phosphorus pentachloride or ferric chloride also produce cleavage. Accordingly, it has hitherto been necessary to resort to indirect methods for the preparation of chloroalkyl esters of aromatic acids, e.g., the reaction of an aromatic acid halide with formaldehyde in the presence of zinc chloride to produce a chloromethyl ester; the reaction of ethylene chlorohydrin with an aromatic acid to produce a chloroethyl ester; the reaction of an aromatic acid chloride with tetrahydrofuran to produce an ω-chlorobutyl ester, etc.

It has now been found that chloroalkyl esters of aromatic acids may be prepared by contacting an alkyl ester of an aromatic acid with chlorine at low temperatures in the presence of actinic radiation.

The success of the present process for the preparation of chloroalkyl esters is surprising, inasmuch as it would have been predicted that, under the conditions employed, either cleavage would take place or addition to the aromatic nucleus would occur. Additive chlorination is, in fact, a competing reaction at lower temperatures, but we have found that the predominant reaction in the present case is substitutive chlorination of the alkyl radical, in contrast to the hitherto-known additive chlorination of aromatic compounds in the same temperature range. Interestingly, the products isolated under conditions forming measurable amounts of aditive chlorination product in accordance with the present invention consist of the alkyl ester of the additively chlorinated aromatic acid and the chloroalkyl ester of the non-chlorinated acid; i.e., those molecules undergoing additive chlorination on the benzenoid nucleus are resistant to substitutive chlorination on the alkyl radical under the conditions presently utilized.

So far as we are aware, the lower alkyl esters of hexachlorocyclohexanecarboxylic acid, which are formed as described in the present application by the chlorination of an alkyl benzoate, are new compounds.

The present process for producing chloroalkyl esters is of particular utility as applied to the lower alkyl esters of aromatic carboxylic acids, wherein carbalkoxy radicals are directly bonded to carbon atoms which are members of an aromatic nucleus of an aromatic hydrocarbon radicals.

By an aromatic nucleus is means a benzene ring, benzene rings directly joined together, or benzene rings fused in a conjugated aromatic ring system, e.g., biphenyl, naphthalene, phenanthrene, etc. By an aromatic hydrocarbon radical is meant a radical containing only carbon and hydrogen atoms and containing one or more benzene rings.

The method of the invention is of particular interest as applied to methyl esters of the presently-preferred aromatic acids containing from one to three benzene rings, whereby there are obtained the corresponding chloromethyl esters essentially uniquely as products. When lower alkyl esters derived from alkanols containing a plurality of carbon atoms are employed in the present process, while the alpha carbon atom of the alkanol-derived portion of the ester is preferentially chlorinated, chlorination may also occur on adjacent carbon atoms, and a mixture of products is obtained.

Exemplary of methyl esters of aromatic acids which may be employed in the present process is methyl benzoate, which is a particularly preferred starting material in the process of the invention. Better than 80% yields of chloromethyl benzoate may be obtained by chlorination of methyl benzoate, operating as described hereinbelow. Other alkyl esters of benzoic acid which may be chlorinated to chloroalkyl benzoates in accordance with this invention include, e.g., the ethyl, propyl, butyl, and amyl benzoates. The present process is also applicable to the production of chloroalkyl esters from alkyl esters of polycyclic aromatic carboxylic acids free of nuclear substituents other than the carbalkoxy radical, such as methyl 1-naphthoate, methyl 2-naphthoate, isobutyl 1-naphthoate, methyl 2-, 3-, and 4-biphenylcarboxylic acid, methyl 9-phenanthroate, methyl 9-anthroate, etc.

A second class of alkyl esters of aromatic acids which may be employed in the present process comprises the polycarboxylic aromatic acid esters. Illustrative of esters of this class which may be used in the process of the invention are dimethyl phthalate, dimethyl isophthalate, dimethyl terephthalate, diethyl phthalate, methyl amyl phthalate, ethyl amyl phthalate, methyl isobutyl terephthalate, dimethyl diphenate, dimethyl 4,4'-biphenyldicarboxylic acid, dimethyl naphthalate (dimethyl 1,8-naphthalenedicarboxylate), tetramethyl prehnitate, dimethyl 9,10-anthracenedicarboxylate, etc.

Additionally, we have made the discovery that the present process may also be applied to alkyl esters of halogen-substituted aromatic acids to produce the corresponding chloroalkyl esters. As examples of such alkyl esters of aromatic acids may be listed, e.g., methyl o-chlorobenzoate, methyl p-chlorobenzoate, methyl 2,4-dichlorobenzoate, ethyl m-chlorobenzoate, isopropyl p-chlorobenzoate, ethyl 2,4,5-trichlorobenzoate, amyl p-chlorobenzoate, methyl 4-chloro-1-naphthoate, ethyl 5-chloro-2-naphthoate, methyl 2-chloro-4-biphenylcarboxylate, methyl 10-chloro-9-anthroate, dimethyl 4-chlorophthalate, dimethyl tetrachlorophthalate, dimethyl 4-chloronaphthalate, etc. While some of the chloroalkyl esters of chlorinated aromatic acids are relatively unstable and subject to decomposition at the elevated temperatures required for the separation of these compounds by distillation techniques, for many purposes, the crude chlorination product may be usable directly, e.g., as an insecticide, and the present process may economically be used as a method of the manufacture thereof.

When direct light activated chlorination is applied to alkyl esters of alkyl-substituted aromatic acids such as methyl p-toluate, in contrast to the above-listed esters of aromatic acids containing nuclear chlorine substituents or free of substituents other than carbalkoxy groups, there are produced, not the corresponding chloroalkyl esters, but rather the chloroalkyl esters of the chloroalkyl-substituted acid, e.g., from methyl p-toluate there is produced chloromethyl p-chloromethylbenzoate.

We have further discovered that alkyl esters of aromatic acids substituted by negative substituents such as nitro radicals do not undergo the present reaction, thus demonstrating that the present synthesis of chloroalkyl esters is unique. Thus, e.g., methyl m-nitrobenzoate, methyl p-nitrobenzoate, and ethyl p-nitrobenzoate were treated with chlorine under conditions identical with those producing chlorination of esters of mono- and dicarboxylic hydrocarbon and chlorine-substituted aromatic acids listed above. No chlorination products could be isolated from the reaction mixture, and the starting materials were recovered unchanged in almost quantitative amounts.

The products of the process of this invention as applied to the presently-preferred classes of starting materials, i.e., the lower alkyl esters of aromatic acids either free of nuclear substituents or having nuclear chlorine substituents, are the corresponding chloroalkyl esters. Exemplary of products obtained by the low-temperature light-catalyzed chlorination of esters of monocarboxylic unsubstituted aromatic acids in accordance with this invention are, e.g., chloromethyl benzoate, α-chloroethyl benzoate, α,β-dichloroethyl benzoate, α-chlorobutyl benzoate, chloromethyl 1-naphthoate, α-chloroethyl 2-naphthoate, α,β-dichloroethyl 1-naphthoate, chloromethyl 4-biphenylcarboxylate, chloromethyl 9-anthroate, etc.

Chlorination of alkyl esters of chloro-substituted aromatic acids by the process of the invention gives, e.g., chloromethyl o-, m-, or p-chlorobenzoate, chloromethyl 2,4-dichlorobenzoate, chloromethyl 2,4,5-trichlorobenzoate, dichloromethyl 3,5-dichlorobenzoate, α-chloroethyl p-chlorobenzoate, α,β-dichloroethyl m-chlorobenzoate, trichloroethyl p-chlorobenzoate, chlorobutyl 2,4-dichlorobenzoate, chloromethyl 5-chloro-1-naphthoate, chloroethyl 10-chloro-9-anthroate, etc.

When esters having the structure of an aromatic nucleus substituted by a plurality of carbalkoxy groups are chlorinated in accordance with the method of the invention, we have discovered that, particularly in cases where the carbalkoxy groups are immediately adjacent to one another, a major product is the monochlorinated ester, i.e., from dimethyl phthalate there is obtained primarily chloromethyl methyl phthalate. The α-chloroalkyl alkyl esters of phthalic acid derived from di-lower-alkyl phthalates are, so far as we are aware, new compounds. Exemplary of such esters provided by this invention are chloromethyl methyl phthalate, α-chloroethyl ethyl phthalate, α-chloro-n-propyl n-propyl phthalate, α-chlorobutyl butyl phthalate, α-chloroamyl amyl phthalate, α-chloroethyl methyl phthalate, chloromethyl ethyl phthalate, etc. These mixed haloalkyl alkyl esters range from mobile liquids to solids, stable at room temperatures. They are of interest as intermediates for chemical syntheses, the chlorine atom being an active locus for reaction and introduction of various functional groups. They may also be used, e.g., as plasticizers for polymers; for example, chloromethyl methyl phthalate may be mixed with a chlorine-containing polymer such as polyvinyl chloride, in an amount of from 30 to 10% by weight of the polymer, whereby the phthalate functions as a softening plasticizing agent. The present chloroalkyl alkyl phthalates having from 1 to 5 carbon atoms in the alkyl radicals of the esters thereof, are also useful biological toxicants, e.g., fungicides, bactericides, etc. For example, chloromethyl methyl phthalate incorporated in agar at a concentration of 1 part per ten thousand inhibits growth of *Aspergillus niger*, no growth being observed on agar plates containing the ester which have been inoculated with this fungus organism and incubated at 25° C. for five days.

Illustrative of chlorinated alkyl esters of aromatic polycarboxylic acids obtainable in accordance with the present process are, e.g., chloromethyl methyl phthalate, α-chloroethyl ethyl phthalate, α-chlorobutyl butyl phthalate, chloroethyl amyl phthalate, chloromethyl methyl isophthalate, bis(chloromethyl) isophthalate, bis(chloroethyl) isophthalate, bis(chloromethyl) terephthalate, bis(chloroethyl) terephthalate, chloromethyl amyl phthalate, chloroethyl methyl diphenate, bis(chloromethyl) diphenate, bis(chloromethyl) 9,10-anthracenedicarboxylate, etc.

As mentioned above, we believe that the lower alkyl 1,2,3,4,5,6 - hexachlorocyclohexanecarboxylates obtained as byproducts in the present process as applied to alkyl benzoates, especially when the process is operated at the lower useful temperature range, e.g., at from 0° to 25° and especially at 15 to 25° C., are also new compounds. Exemplary of esters produced by this process are methyl 1,2,3,4,5,6-hexachlorocyclohexanecarboxylate, ethyl 1,2,3,4,5,6-hexachlorocyclohexanecarboxylate, isopropyl 1,2,3,4,5,6-hexachlorocyclohexanecarboxylate, butyl 1,2,3,4,5,6-hexachlorocyclohexanecarboxylate, and amyl 1,2,3,4,5,6-hexachlorocyclohexanecarboxylate. It will be recognized that these compounds can exist in various stereoisomeric configurations and it is intended that the present nomenclature embrace all such isomers. These esters are generally stable, viscous oily to solid materials, soluble in a variety of organic solvents. They are particularly useful as biological toxicants and may be used, e.g., as insecticides, fungicides, herbicides, etc. Thus, for example, methyl 1,2,3,4,5,6-hexachlorocyclohexanecarboxylate introduced at a concentration of 10 parts per million into an aqueous suspension of third and fourth instar yellow fever mosquito larvae (*Aëdes aegypti*) produces 100% kill of said larvae. Incorporated in Sabouraud's dextrose agar at a concentration of 1 part per thousand, methyl hexachlorocyclohexanecarboxylate inhibits the growth of the fungus *Aspergillus niger* during incubation of the agar plate for 5 days at 25° C. Applied to foliage as a spray in a solution containing an 0.5% concentration of the ester, at a rate of 9 lbs. per acre, methyl hexachlorocyclohexane severely damages or kills young broadleaf plants such as radish, clover, beet, cotton, cucumber, and bean, while leaving grasses such as wild oats, brome, and rye essentially unaffected. Conversely, when methyl 1,2,3,4,5,6-hexachlorocyclohexanecarboxylate is applied as a pre-emergent spray to soil containing seeds of the same spectrum of broad- and narrow-leaf plants at a rate equivalent to 25 lbs./acre, the broadleaf plants such as sugar beet, red clover, radish and cucumber emerge as healthy seedlings, but the grasses are injured, the emerging wild oats, brome and rye seedling being twisted, stunted and dying.

The lower alkyl esters of hexachlorocyclohexanecarboxylic acid are produced as described hereinbelow in the present process as operated at from 0° to 25° C. They are obtained in accordance with this process in admixture with chloroalkyl esters of benzoic acid and may be separated therefrom by, for example, distillation or other separative techniques.

In carrying out the present process for the production of chlorinated esters of aromatic acids, the aromatic acid alkyl ester is simply contacted with gaseous chlorine at temperatures of from 0° to 100° C. Preferred are temperatures in the range of from 15° C. to 50° C. Preferably, the aromatic ester is dissolved or suspended in an anhydrous inert solvent or diluent. Suitable solvents for the present process are polyhalogenated solvents, resistant to chlorination, such as tetrachloroethane; particularly suitable are low-boiling perhalogenated solvents such as carbon tetrachloride, and the Freons, e.g., trichloromonofluoromethane, dichlorodifluoromethane, chlorotrifluoromethane, trichlorotrifluoroethane, dichlorotetrafluoroethane, etc. Substantially anhydrous conditions should be maintained in the reaction to avoid hydrolysis of the ester, since such hydrolysis would be catalyzed by the hydrogen chloride formed in the present substitution chlorination process.

The present reaction is catalyzed by free radicals and is conducted in accordance with the present process under free radical-producing conditions, e.g., in the presence of actinic radiation. Light, i.e., sunlight or the light emitted by fluorescent or incandescent lamps, is a preferred source of radiation for acceleration of the present reaction, but it is not excluded to use other sources of exciting radiation such as ultraviolet rays, X-rays, and waves of even shorter length.

In one embodiment of the present process, gaseous chlorine is introduced into the alkyl ester, which may be dissolved in an inert solvent, at a rate sufficiently high so that a portion of the chlorine passes through the chlorinating mass unreacted. By this means, hydrogen chloride is swept out of the reaction mixture and purer and more stable products are obtained. Generally, introduction of chlorine into the reaction mixture at a rate such that 5–10% passes through unreacted is effective to disengage and remove the hydrogen chloride formed. Alternatively, the chlorine may be introduced into the reaction mixture at a rate whereat it is essentially completely absorbed, hydrogen chloride being removed from the chlorination mixture subsequently by sparging with an inert gas such as nitrogen, by drawing a vacuum on the system, etc.

Preferably, the chlorination is continued until the amount of organically combined chlorine in the charge is between 95 and 110% of the amount theoretically required for conversion of the alkyl ester charged to the desired chlorinated ester. In a preferred embodiment of the present invention this is the monochloroalkyl ester.

The present reaction may be adapted to either continuous or batch processes and details of the process will vary accordingly. Thus, e.g., for a continuous commercial operation, there are available submersion-type light sources which may be immersed in a reactor. The chlorine and alkyl ester may be passed into the reactor in countercurrent flow to one another and the product chloroalkyl ester continuously removed from the reaction zone.

The invention is further illustrated, but not limited, by the following examples:

Example 1

A solution of 60 ml. of methyl benzoate in 60 ml. of carbon tetrachloride was placed in a glass flask in a hood, the only illumination for which was a fluorescent ceiling light in the windowless laboratory in which the experiment was carried out. Gaseous chlorine was passed into the solution at a rate of 2 liters per hour for about 1 hour, and then at 5 liters per hour, for a total of 10½ hours; the maximum temperature reached by the solution was 33° C. By subsequent distillation, after recovery of 18.3 g. of unreacted methyl benzoate, there were obtained 46.9 g. of chloromethyl benzoate, as a fraction boiling at 58–74° C./1 mm., and 15.0 g. of a cut boiling chiefly at 145–150° C./1 mm.

A redistilled sample of the chloromethyl benzoate obtained in this experiment, $n_D^{25}$ 1.5328, B. 72–74° C./1 mm., analyzed correctly for $C_8H_7ClO_2$; by hydrolysis and subsequent recovery of benzoic acid, M. 122–3° C., it was established that the nuclear aromatic carbon atoms were not chlorinated.

The cut boiling chiefly at 145–50° C./1 mm. solidified on standing; after two recrystallizations from hexane, the solid product melted at 116–119° C. This material was identified as methyl 1,2,3,4,5,6-hexachlorocyclohexanecarboxylate:

|  | Found | Calcd. for $C_8H_8Cl_6O_2$ |
| --- | --- | --- |
| Percent C | 27.52 | 27.54 |
| Percent H | 2.63 | 2.31 |
| Percent Cl | 60.45 | 60.98 |

Example 2

Gaseous chlorine was passed into a solution of 60 ml. of methyl benzoate in 60 ml. of carbon tetrachloride as described above, for a total of 12½ hours, during which the maximum solution temperature reached was 44° C. After recovery of 6.0 g. of unreacted methyl benzoate, there were obtained by distillation 62.1 g. of chloromethyl benzoate and 17.3 g. of methyl hexachlorocyclohexanecarboxylate.

Example 3

A solution of 167 g. of methyl benzoate in 75 ml. of carbon tetrachloride was placed in a glass flask provided with a magnetic stirrer and reflux condenser and illuminated by a 150 watt reflector-spot lamp at a distance of 26 inches from the flask. Dry chlorine gas was passed into the solution at a rate at which the solution remained nearly colorless; the solution temperature rose in one hour to 54° C., after which the introduction of chlorine was continued at a reduced rate for another six hours while the solution temperature was held at 41–43° C. The solvent was stripped off and the crude product distilled through a column packed with glass helices. After recovery of 36.4 g. of unreacted methyl benzoate, there were obtained 42.5 g. of chloromethyl benzoate, $n_D^{25}$ 1.5323.

Example 4

Gaseous chlorine was passed slowly into a stirred solution of 75.1 g. (0.50 mole) of ethyl benzoate in 100 ml. of carbon tetrachloride, in a glass flask illuminated by diffuse sunlight, for two hours. The chlorine flow was discontinued and the solution let stand overnight; the following day the introduction of chlorine was resumed with the flask in direct sunlight. When the solution temperature rose to 37° C., the flask was shielded from the sun, while the chlorine flow was continued; the maximum temperature reached by the solution was 44° C. The chlorine flow was continued for a total of nine hours, after which the chlorinated reaction mixture was sparged with nitrogen and let stand overnight. By distillation, there were obtained 33.8 g. of chloroethyl benzoate, B. 118–126° C./3.5–5 mm. (found, Cl=19.10%; calcd. for $C_9H_{10}ClO_2$, 19.21% Cl). By acid hydrolysis, this product was converted to benzoic acid, M. 122–3° C., and acetaldehyde, 2,4-dinitrophenyl hydrazone M. 163–4° C., identifying the product as α-chloroethyl benzoate.

Example 5

Chlorine was passed into a solution of 73.1 g. of n-butyl benzoate in 100 ml. of carbon tetrachloride in a glass flask under natural daylight illumination, the gas flow rate being controlled so that the solution remained essentially colorless during the first hour. The chlorine was then added more rapidly for another hour, the flow being discontinued when the solution temperature reached 68° C. The weight of crude chlorination product, after stripping off the solvent, corresponded to 96.5% of the theory for the monochlorinated ester. Hydrolysis of the chlorinated ester gave benzoic acid, establishing the absence of nuclear chlorination; and the ester isolated by distillation and boiling at 103–33° C./1 mm. corresponded in elementary analysis to monochlorobutyl benzoate. Further tests indicated that a mixture of monochlorobutyl benzoate esters had been formed.

*Example 6*

Gaseous chlorine was passed into a solution of 63.0 g. of butyl benzoate in 125 ml. carbon tetrachloride, illuminated by a spot-light at a distance of 30 inches. The gas flow rate was controlled so that the solution remained almost colorless. After 5 and ½ hours, the introduction of chlorine was discontinued and the solvent was removed under reduced pressure. The gain in weight of the solution corresponded approximately to 1.5 gram atoms of chlorine per gram mole of butyl benzoate. By distillation, there were separated a fraction corresponding in analysis to monochlorobutyl benzoate, $n_D^{25}$ 1.514, B. 112–115° C./1 mm.

|  | Found | Calcd. for $C_{11}H_{13}ClO_2$ |
|---|---|---|
| Percent C | 61.73 | 62.12 |
| Percent H | 6.10 | 6.16 |
| Percent Cl | 17.14 | 16.67 | and higher boiling material corresponding closely in elementary analysis to dichlorobutyl benzoate.

*Example 7*

This example illustrates the chlorination of a dicarboxylic acid alkyl ester.

Gaseous chlorine was slowly passed into a solution of 97.1 g. of dimethyl phthalate in 100 ml. of carbon tetrachloride while the solution was intermittently illuminated by a photo-flood lamp six feet from the flask. After about 2 and ½ hours, the flow of chlorine was stopped and the solution let stand overnight; the next day the chlorine flow was resumed for an additional eight hours, again with intermittent illumination. The maximum temperature reached by the chlorination mixture was 30° C. By fractional distillation of the reaction mixture, there were separated 14.7 g. of product boiling at 148–155° C./1.7 mm., $n_D^{25}$ 1.5287, identified by analysis as chloromethyl methyl phthalate.

*Example 8*

In a repetition of the above experiment, gaseous chlorine was passed into a solution of 126.8 g. of dimethyl phthalate in 100 ml. of carbon tetrachloride contained in a glass flask illuminated by a reflector spot-lamp at a distance of 26 inches. The chlorine flow was controlled to a rate at which the solution remained substantially colorless, and was discontinued after six hours. The maximum solution temperature during the chlorination was 45° C. The crude chlorination product was separated by stripping off the solvent and chlorine-containing gases. It was found that the weight of the crude product was 138.5 g., which represents a gain in weight about one-half of that required for formation of the corresponding monochloroalkyl alkyl phthalate ester. Fractional distillation gave 23.3 g. of product boiling at 134–135° C./0.9 mm., analyzing for chloromethyl methyl phthalate.

*Example 9*

When dimethyl isophthalate was subjected to chlorination in the presence of actinic radiation (maximum temperature 41°), indications were observed that both carbalkoxy groups underwent chlorination. However, when the product was heated to 100° C. under vacuum, there was vigorous evolution of a volatile material; on fractional distillation, the first fraction collected, at 123–129° C./13–15 mm., contained isophthaloyl chloride, identified as the dianilide, softening 280° C., M. 285–8° C. At 167–172° C./13 mm., there were collected 20.7 g. of product, $n_D^{25}$ 1.5621, having the reactions of an acid chloride and containing 31.93% chlorine. This corresponds best to the half-chloromethyl ester, half acid chloride of isophthalic acid. Apparently, the carbalkoxy groups of the dimethyl isophthalate are not subject to the steric hindrance of dimethyl phthalate and are both accessible to chlorination, but the bis(chloromethyl) ester is not stable at distillation temperatures.

*Example 10*

This example describes chlorination of a chloroaromatic acid alkyl ester.

Methyl 3,4-dichlorobenzoate was prepared by adding 7.5 ml. of concentrated sulfuric acid to a mixture of 95 g. of 3,4-dichlorobenzoic acid, 48 g. of methanol, and 200 ml. of ethylene dichloride, and refluxing overnight. The oil layer was separated, washed with water and dilute aqueous sodium bicarbonate, and distilled under vacuum. Methyl 3,4-dichlorobenzoate was collected as a liquid which solidified on standing; M. 48–49° C.

Dry chlorine gas was passed into a solution of 35.7 g. of methyl 3,4-dichlorobenzoate prepared as described above, in 125 ml. of carbon tetrachloride. The glass reaction flask was illuminated by a 150 watt reflector spotlamp at a distance of 26 inches, and by diffuse and direct sunlight. The introduction of chlorine was continued at a rate at which the solution remained substantially colorless, for a total of five hours; maximum reaction mixture temperature, 44° C. After removal of the solvent under reduced pressure, the crude reaction product weighed 48.3 g., indicating that dichlorination of the methyl ester group had occurred. The product which came over on distillation at 129–159° C./13 mm. analyzed for 3,4-dichlorobenzoyl chloride, indicating the ester formed is unstable at distillation temperatures.

*Example 11*

By a process as described above, dry chlorine was added to an illuminated solution of 41.6 g. of ethyl o-chlorobenzoate in 150 ml. of carbon tetrachloride for 6 and ¾ hours. Reaction with aqueous ammonia indicated that the crude product contained the acid chloride. The product collected by distillation at 169–171° C./10 mm. was hydrolyzed with sulfuric acid and distilled; when 2,4-dinitrophenyl hydrazine was added to the distillate, a yellow precipitate formed which melted, after recrystallization from ethanol, at 155–156° C. The dinitrophenyl hydrazone of chloroacetaldehyde melts at 159° C.; thus, the chlorination product contained a dichloroethyl ester. o-Chlorobenzoic acid was separated from the aqueous hydrolysis mixture, indicating the absence of nuclear chlorination. The ester was found by analysis to contain 44% chlorine; dichloroethyl o-chlorobenzoate requires 41.63% chlorine; trichloroethyl o-chlorobenzoate about 49% chlorine. The product is accordingly a mixture of polychloroethyl o-chlorobenzoates including α,β-dichloro-substituted esters.

*Example 12*

Introduction of chlorine into a solution of 24 g. of ethyl 3,4-dichlorobenzoate in 100 ml. of carbon tetrachloride in a glass flask illuminated by a spot-light at a distance of about two feet for 7 hours (maximum solution temperature 36.5° C.), followed by removal of the solvent and gases under vacuum, gave 31.3 g. of a crude product containing 54% chlorine (monochloroethyl 3,4-dichlorobenzoate requires 41.9% chlorine). Hydrolysis of the product gave 3,4-dichlorobenzoic acid (no depression of melting point when mixed with an authentic sample) indicating the absence of nuclear chlorination. The hydrolysis distillate gave an orange 2,4-dinitrophenyl hydrazone, indicating the presence of an α-chloro atom on the alkyl ester radical. On distillation, the reaction product decomposed to the corresponding benzoyl chloride.

While the invention has been described with particular reference to various specific embodiments thereof, it will be recognized that variations can be made in the present

What is claimed is:

1. The process for converting alkyl esters of aromatic carboxylic acids into corresponding chloroalkyl esters which comprises introducing gaseous chlorine into intimate contact with a lower alkyl ester of an aromatic acid, said aromatic acid comprising an aromatic nucleus, directly bonded by a nuclear carbon atom to at least one carbalkoxy radical, at a temperature of between 0° and 100° C., in the presence of actinic radiation.

2. The process of claim 1, wherein the said alkyl ester is the methyl ester.

3. The process of claim 1, wherein the said aromatic acid is a monocyclic aromatic acid.

4. The process which comprises introducing gaseous chlorine into intimate contact with methyl benzoate at a temperature of between 15° and 50° C. in the presence of actinic radiation, and distilling chloromethyl benzoate from the resulting reaction mixture.

5. The process of claim 1, wherein gaseous chlorine is introduced into intimate contact with the said alkyl ester of an aromatic acid in a perhalogenated lower alkyl solvent.

6. The process of claim 1, wherein the chlorine is introduced for a sufficient length of time only to effect conversion of the said alkyl ester to the corresponding monochloroalkyl ester.

7. The process for converting alkyl esters of aromatic carboxylic acids to the corresponding α-chloro-substituted alkyl esters which comprises introducing gaseous chlorine into intimate contact with the lower alkyl ester of an unsubstituted aromatic carboxylic acid, said aromatic acid comprising an aromatic nucleus, directly bonded by a nuclear carbon atom to at least one carbalkoxy radical, at a temperature of between 0° and 100° C., in the presence of actinic radiation, for a sufficient length of time to effect conversion of the said alkyl ester to the corresponding monochloroalkyl ester.

8. The process which comprises contacting gaseous chlorine with methyl benzoate in a perhalogenated solvent at a temperature below 40° C. in the presence of actine radiation, whereby there is formed a mixture of chloromethyl benzoate and methyl 1,2,3,4,5,6-hexachlorocyclohexanecarboxylate, and isolating said methyl hexachlorocyclohexanecarboxylate from the resulting reaction mixture.

9. The process of claim 1 wherein said temperature is between 15° C. and 50° C.

10. The process of claim 7 wherein the temperature is between 15° and 50° C.

References Cited in the file of this patent

UNITED STATES PATENTS

| | | |
|---|---|---|
| 1,761,475 | Glubelmann et al. | June 3, 1930 |
| 2,390,470 | Sumner | Dec. 4, 1945 |
| 2,665,301 | Monroe et al. | Jan. 5, 1954 |
| 2,671,108 | Johnson | Mar. 21, 1954 |
| 2,816,134 | Toland | Dec. 10, 1957 |
| 2,865,959 | Toland | Dec. 23, 1958 |

OTHER REFERENCES

Ellis et al.: Chemical Action of Ultraviolet Rays (1941), pages 526–550.